United States Patent [19]
Toeniskoetter

[11] Patent Number: 5,653,324
[45] Date of Patent: Aug. 5, 1997

[54] LIFT AND TRANSFER MECHANISM

[75] Inventor: James B. Toeniskoetter, Troy, Mich.

[73] Assignee: TESCO Engineering, Inc., Auburn Hills, Mich.

[21] Appl. No.: 481,873

[22] Filed: Jun. 7, 1995

[51] Int. Cl.$^6$ .................................................. B65G 47/00
[52] U.S. Cl. ..................... 198/345.3; 198/375; 198/680; 198/803.01
[58] Field of Search ................................. 198/345.3, 375, 198/377, 378, 474.1, 476.1, 477.1, 680, 802, 803.01

[56] References Cited

U.S. PATENT DOCUMENTS

| | | | |
|---|---|---|---|
| 3,286,811 | 11/1966 | McWilliams | 198/802 |
| 3,515,261 | 6/1970 | Before et al. | 198/802 |
| 3,662,874 | 5/1972 | Muller | 198/802 |
| 4,371,075 | 2/1983 | Erlichman | 198/345.3 |
| 4,724,944 | 2/1988 | Koshigai et al. | 198/378 |
| 4,991,707 | 2/1991 | Alexander et al. | |
| 5,141,093 | 8/1992 | Alexander | 198/378 |

*Primary Examiner*—Joseph E. Valenza
*Attorney, Agent, or Firm*—Fildes & Outlans, P.C.

[57] ABSTRACT

Article handling apparatus includes a pair of first and second spaced parallel elongate conveying tracks defining a conveying path and at least one transfer station. A carrier mechanism is movably mounted on the tracks for linear movement along the conveying path into and out of the transfer station. An article engagement device is mounted on the carrier mechanism and movable relative to the carrier mechanism between a conveying position and a transfer position. A lift actuator mechanism is mounted for vertical movement relative to the spaced conveying tracks at the transfer station. An article engagement device actuator is movably mounted for vertical movement on the carrier mechanism. The article engagement device actuator is linked to the article engagement device and actuates movement of the device between the conveying position and transfer positions upon movement of the device actuator. The device actuator includes a lifting member engageable with the lift actuator mechanism upon movement of the carrier mechanism into the transfer station whereby during engagement of the member and mechanism, the article engagement device is movable upon movement of the lift actuator mechanism.

16 Claims, 1 Drawing Sheet

5,653,324

LIFT AND TRANSFER MECHANISM

FIELD OF THE INVENTION

The present invention relates to article handling apparatus and more particularly to article handling apparatus for handling vehicle body panels conveyed along an assembly line between article transfer stations.

BACKGROUND OF THE INVENTION

It is known in the art relating to vehicle assembly to move articles, such as body panels, along a conveyor and to transfer the articles at various points along the conveyor for purposes of performing a further step in the assembly process. Conveyance and transfer of articles to be assembled is performed by various automated equipment, most of which includes robots and/or complicated mechanical structures.

SUMMARY OF THE INVENTION

The present invention provides article handling apparatus of simple construction having continuous conveying tracks and a linearly displaced carrier movable on the tracks for conveying articles for accurate placement at a transfer station.

More specifically, the article handling apparatus includes a pair of first and second spaced parallel elongate tracks that define a conveying path and at least one transfer station. A carrier mechanism is movably mounted on the tracks for movement along the conveying path into and out of the transfer station. An article engagement device is mounted on the carrier mechanism and movable relative to the carrier mechanism between a conveying position and a transfer position. A lift actuator mechanism is mounted for vertical movement relative to the spaced conveying tracks at the transfer station. An article engagement device actuator is movably mounted for vertical movement on the carrier mechanism. The article engagement device actuator is linked to the article engagement member and actuates movement of the engagement member between the conveying position and transfer position upon movement of the device actuator. The device actuator includes a lifting member engageable with the lift actuator mechanism upon movement of the carrier mechanism into the transfer station. Upon engagement of the lifting member and lift actuator mechanism, the article engagement device is movable upon movement of the lift actuator mechanism.

A locking mechanism locks the article engagement device in the conveying position during movement of the carrier mechanism into and out of the transfer station. An unlocking mechanism at the transfer station unlocks the locking mechanism to allow the article engagement device to move. The locking mechanism includes a conveying track follower in urged engagement with one of the conveying tracks. The unlocking mechanism includes an unlocking cam disposed relative to one of the conveying tracks whereby movement of the follower over the unlocking cam releases the locking mechanism.

Preferably, the actuator mechanism includes an upper and lower plurality of horizontally disposed rollers and the lifting member is a horizontally disposed elongate arm receivable between the rollers. A lift actuator drive assembly controls up and down movement of the lift actuator.

These and other features and advantages of the invention will be more fully understood from the following detailed description of the invention taken together with the accompanying drawings.

DETAILED DESCRIPTION OF THE INVENTION

Figure 1:
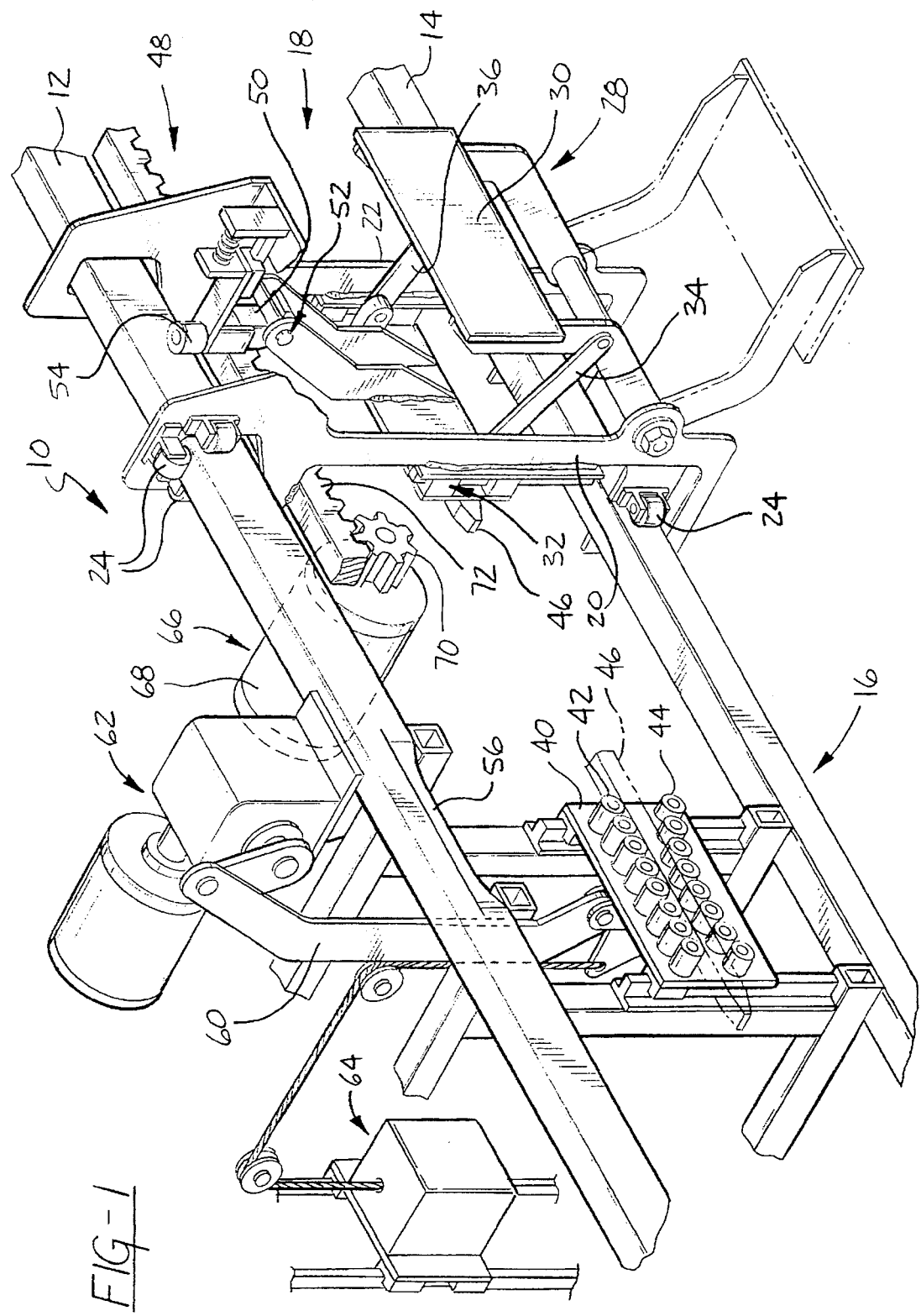
FIG. 1 is a perspective view of the article handling apparatus constructed in accordance with the present invention illustrating a transfer station and a representative section of an adjacent conveying path.

Referring now to the drawing in detail, numeral 10 generally indicates an article handling apparatus in a vehicle assembly line for conveying and transferring vehicle body panels as hereinafter more fully described. The handling apparatus 10 generally comprises a pair of first and second spaced parallel elongate conveying tracks 12,14 defining a conveying path and at least one transfer station 16. A carrier mechanism 18, comprising spaced end plates 20,22 and rollers 24 is movably mounted on tracks 12,14 for linear movement along the conveying path into and out of the transfer station 16.

An article engagement device 28 includes an article engagement member 30 pivotally mounted on the carrier mechanism 18 between end plates 20,22. The article engagement member 30 includes conventional means for engaging an article such as a vehicle body panel. The engagement member 30 carries an article between an upward conveying position, shown, and a transfer position wherein the article engagement member is pivoted downwardly at the transfer station 16. The article engagement device 28 includes a device actuator 32 linked by linkages 34,36 to the article engagement member 30 to actuate pivotable movement of the article engagement member.

The transfer station 16 includes a lift actuator mechanism 40 engageable with the article engagement device actuator 32 for controlling and actuating vertical movement of the article engagement member 30 relative to the spaced conveying tracks 12,14 at the transfer station.

In the embodiment shown, the lift actuator mechanism 40 includes an upper and lower plurality of generally horizontally disposed rollers 42,44. The article engagement device actuator 32 includes a lifting member 46 engagable with the plurality of spaced horizontal rollers 42,44 when the carrier mechanism 18 reaches the transfer station 16. Preferably the lower rollers 44 are disposed in an arcuate orientation to facilitate engagement with lifting member 46.

A locking mechanism 48, including a spring biased hook arrangement 50 and a latch assembly 52, locks the article engagement device 28 in the conveying position during conveyance along the tracks 12,14. The spring biased hook arrangement 50 is movably mounted on the carrier mechanism 18 between end plates 20,22 and includes a roller 54 mounted on the hook arrangement 50 in urged engagement with the upper conveying track 12. The latch assembly 52 is connected to the article engagement device actuator 32.

At the transfer station 16, the upper conveying track 12 includes an unlocking cam 56 over which the roller 54 of the hook arrangement 50 travels. The urged engagement disposition of the roller 54 causes the hook arrangement 50 to be displaced inwardly toward the upper conveying track 12 as the roller follows the cam 56 when the carrier mechanism 18 is at the transfer station 16. With the roller 54 displaced fully inwardly, the latch assembly 52 is released and made free to be moved vertically through movement of the lift actuator mechanism 40. Engagement of lifting member with rollers 44 of the lift actuator mechanism raises the actuator 32 slightly when the carrier mechanism enters the transfer station. This releases tension on the hook arrangement 50, aiding release of the latch assembly 52.

The lift actuator mechanism 40 is raised and lowered through the upward and downward movement of a connecting member 60 displaced by a lift motor drive 62. A counterweight assembly 64 in connection with the lift actuator mechanism 40 facilitates the upward and downward movement of the lift actuator mechanism and lessens lift motor drive 62 load as is known. Movement of the lift actuator mechanism 40 likewise moves the device actuator 32 and thereby the article engagement device 30.

The carrier mechanism 18 is moved along conveying tracks 12,14 through the controlled operation of a drive mechanism 66. Drive mechanism 66 includes a drive motor 68 having a driving member illustrated as a pinion 70 in engagement with a driven member, illustrated as a rack 72 mounted on the carrier mechanism 18.

OPERATION OF THE INVENTION

Carrier mechanism 18 is moved into and out of transfer station 16 along tracks 12,14 by drive motor 68 driving rack 72 and pinion 70 mounted on the carrier mechanism. As the carrier mechanism 18 approaches the transfer station 16, lifting member 46 is cammed into the lift actuator mechanism 40. Locking mechanism 48, which locks the engagement member 30 in the conveying position during transit between stations 16 is unlocked through the cam action between unlocking cam 56 and locking mechanism 48. As lifting member 46 contacts the first rollers 44 of lift actuator mechanism 40, tension is released on the hook arrangement 50 in locking mechanism 48.

During continued movement of the carrier mechanism 18 into the transfer station 16, roller 54 in the locking mechanism 48 contacts and follows the unlocking cam 56 and the spring pressure in the locking mechanism allows the locking mechanism to become unlatched. The article handling apparatus 10 moves the rest of the way into the transfer station 16 and stops with the lifting member 46 fully engaged between rollers 42,44.

As the latch assembly 52 is released by the hook arrangement 50 at the transfer station 16, the device actuator 32 can be moved downwardly, actuating downward pivotable movement of the engagement member 30. Lift motor drive 62 is operable while the carrier mechanism 18 is in the transfer station 16 to lower and raise the lift actuator mechanism 40. With the lifting member 46 in the raised position, as the carrier mechanism 18 is moved out of the transfer station, the hook arrangement 50 reengages the latch assembly 52 locking the engagement member 30 in the transfer position.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. Article handling apparatus comprising:

a pair of first and second vertically spaced parallel elongate conveying tracks defining a conveying path and at least one transfer station;

a carrier mechanism movably mounted on said tracks for movement along said conveying path into and out of said transfer station;

an article engagement device including an article engagement member mounted on said carrier mechanism and pivotally movable relative to said carrier mechanism between a conveying position and a transfer position;

a lift actuator mechanism mounted at said transfer station for vertical movement relative to said spaced conveying tracks;

an article engagement device actuator movably mounted for linear vertical movement in a plane parallel to the plane defined by said vertically spaced conveying tracks and on said carrier mechanism; said article engagement device actuator being linked to said article engagement member and actuating movement of said engagement member between said conveying position and transfer positions upon movement of said device actuator;

said device actuator including a lifting member engageable with said lift actuator mechanism upon movement of said carrier mechanism into said transfer station whereby upon engagement of said lifting member and lift actuator mechanism, said article engagement member is pivotally moved upon movement of said lift actuator mechanism.

2. The apparatus of claim 1 wherein said article engagement device actuator includes a locking mechanism for locking said article engagement device in said conveying position during movement of said carrier mechanism into and out of said transfer station.

3. The apparatus of claim 2 further including an unlocking mechanism at said transfer station for unlocking said locking mechanism to allow said article engagement device to move.

4. The apparatus of claim 3 wherein said locking mechanism includes a conveying track follower in urged engagement with one of said conveying tracks and wherein said unlocking mechanism includes an unlocking cam disposed relative to said one of said conveying tracks whereby movement of said follower over said cam element releases said locking mechanism.

5. The apparatus of claim 3 wherein said lift actuator mechanism includes an upper and lower plurality of horizontally disposed rollers and said lifting member is a horizontally disposed elongate arm receivable between said rollers.

6. The apparatus of claim 3 further including a lift actuator drive assembly for controllably moving said lift actuator mechanism up and down.

7. The apparatus of claim 1 further including a drive mechanism for controllably moving said carrier mechanism into and out of said transfer station.

8. The apparatus of claim 7 wherein said drive mechanism includes a drive motor, a pinion rotatably driven by said drive motor, and a rack driven by said pinion mounted on said carrier mechanism.

9. Article handling apparatus comprising:

a pair of first and second spaced parallel elongate conveying tracks defining a conveying path and at least one transfer station;

a carrier mechanism movably mounted on said tracks for movement along said conveying path into and out of said transfer station;

an article engagement device including an article engagement member mounted on said carrier mechanism and movable relative to said carrier mechanism between a conveying position and a transfer position;

a lift actuator mechanism mounted for vertical movement relative to said spaced conveying tracks at said transfer station;

an article engagement device actuator movably mounted for vertical movement on said carrier mechanism; said article engagement device actuator being linked to said article engagement member and actuating movement of said engagement member between said conveying position and transfer positions upon movement of said device actuator;

said article engagement device actuator including a locking mechanism for locking said article engagement device in said conveying position during movement of said carrier mechanism into and out of said transfer station;

an unlocking mechanism at said transfer station for unlocking said locking mechanism to allow said article engagement device to move;

said locking mechanism including a conveying track follower in urged engagement with one of said conveying tracks and wherein said unlocking mechanism includes an unlocking cam disposed relative to said one of said conveying tracks whereby movement of said follower over said cam element releases said locking mechanism;

said device actuator including a lifting member engageable with said lift actuator mechanism upon movement of said carrier mechanism into said transfer station whereby upon engagement of said lifting member and lift actuator mechanism, said article engagement member is pivotally moved upon movement of said lift actuator mechanism.

10. The apparatus of claim 9 further including a lift actuator drive assembly for controllably moving said lift actuator mechanism up and down.

11. The apparatus of claim 9 further including a drive mechanism for controllably moving said carrier mechanism into and out of said transfer station.

12. The apparatus of claim 11 wherein said drive mechanism includes a drive motor, a pinion rotatably driven by said drive motor, and a rack driven by said pinion mounted on said carrier mechanism.

13. Article handling apparatus comprising:

a pair of first and second spaced parallel elongate conveying tracks defining a conveying path and at least one transfer station;

a carrier mechanism movably mounted on said tracks for movement along said conveying path into and out of said transfer station;

an article engagement device including an article engagement member mounted on said carrier mechanism and movable relative to said carrier mechanism between a conveying position and a transfer position;

a lift actuator mechanism mounted for vertical movement relative to said spaced conveying tracks at said transfer station;

said lift actuator mechanism including an upper and lower plurality of horizontally disposed rollers and said lifting member is a horizontally disposed elongate arm receivable between said rollers;

an article engagement device actuator movably mounted for vertical movement on said carrier mechanism; said article engagement device actuator being linked to said article engagement member and actuating movement of said engagement member between said conveying position and transfer positions upon movement of said device actuator;

said article engagement device actuator including a locking mechanism for locking said article engagement device in said conveying position during movement of said carrier mechanism into and out of said transfer station;

an unlocking mechanism at said transfer station for unlocking said locking mechanism to allow said article engagement device to move;

said device actuator including a lifting member engageable with said lift actuator mechanism upon movement of said carrier mechanism into said transfer station whereby upon engagement of said lifting member and lift actuator mechanism, said article engagement member is pivotally moved upon movement of said lift actuator mechanism.

14. The apparatus of claim 13 further including a lift actuator drive assembly for controllably moving said lift actuator mechanism up and down.

15. The apparatus of claim 13 further including a drive mechanism for controllably moving said carrier mechanism into and out of said transfer station.

16. The apparatus of claim 15 wherein said drive mechanism includes a drive motor, a pinion rotatably driven by said drive motor, and a rack driven by said pinion mounted on said carrier mechanism.

* * * * *